Patented June 30, 1925.

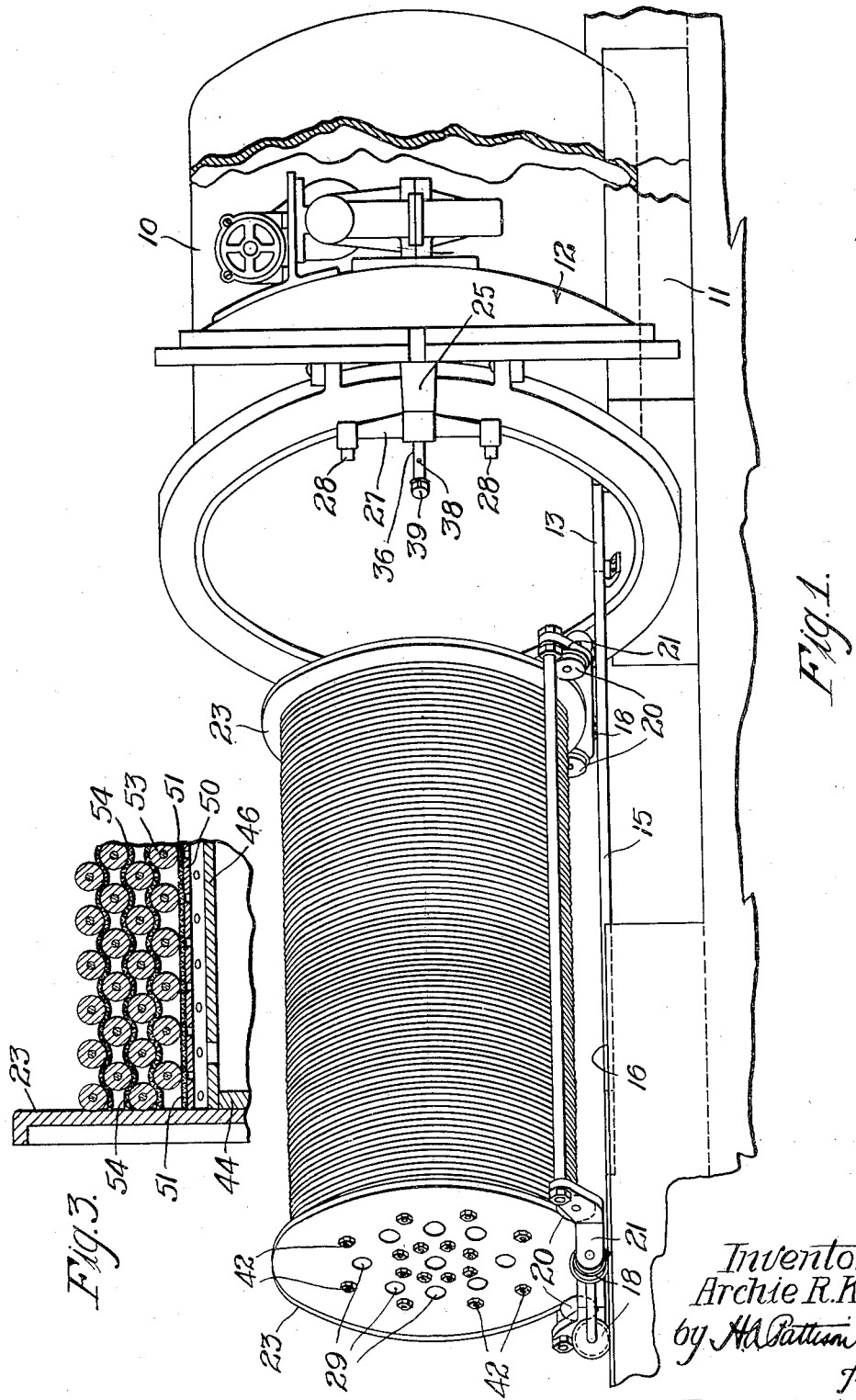

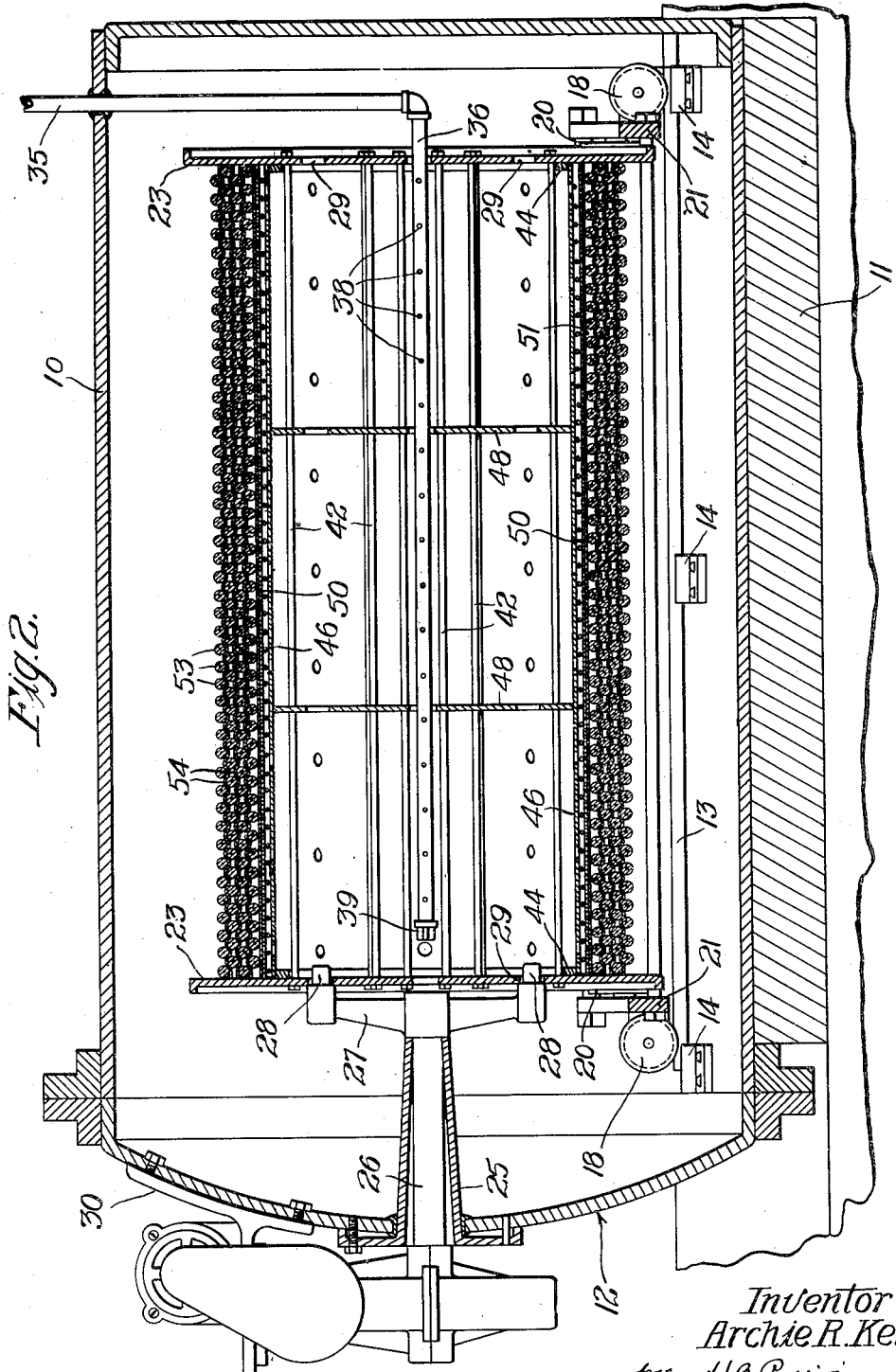

1,543,926

UNITED STATES PATENT OFFICE.

ARCHIE R. KEMP, OF TOWACO, NEW JERSEY, ASSIGNOR TO WESTERN ELECTRIC COMPANY, INCORPORATED, OF NEW YORK, N. Y., A CORPORATION OF NEW YORK.

METHOD OF VULCANIZING RUBBER AND SIMILAR MATERIALS.

Application filed April 30, 1923. Serial No. 635,541.

*To all whom it may concern:*

Be it known that I, ARCHIE R. KEMP, a citizen of the United States, residing at Towaco, in the county of Morris and State of New Jersey, have invented certain new and useful Improvements in Methods of Vulcanizing Rubber and Similar Materials, of which the following is a full, clear, concise, and exact description.

This invention relates to methods of vulcanizing rubber and similar materials, and more particularly to the vulcanization of materials of this nature in strand form or surrounding a core.

In accordance with one method which has been employed to some extent in the insulation of electrical conductors of considerable length a compound of rubber and other materials is extruded over the conductor and the covered conductor is wound on a reel, the reel then being placed in an oven and subjected to vulcanizing temperatures, sometimes in the presence of steam.

In order to insure uniform vulcanization of the insulating material throughout the length of the conductor it is desirable that all portions thereof be subjected simultaneously and uniformly to the same temperature. Since in some instances there are several layers of sheathed conductors on the reel, the layers first reached by the heating medium shield and thereby delay the heating of other layers.

The effectiveness of the rubber or other material as an insulation being dependent to some extent upon the thickness of its wall it is desirable to prevent the deformation of the somewhat plastic material during the vulcanizing process, which might in some instances cause a decentralization of the core therein.

An object of the present invention is to render accessible to the heating medium used in vulcanization a plurality of portions of material arranged in adjacent layers.

Another object of the invention is to separate adjacent layers of portions of vulcanizable material by foraminous material, thereby providing paths for the heating medium used in the vulcanizing process.

A further object of the invention is to separate with foraminous material adjacent layers of core sheathed with vulcanizable material when wound on a drum having a foraminous peripheral portion to provide paths for the heating medium so that such medium may reach the intermediate layers either from the exterior or from the interior of the reel.

An additional object is to employ means between adjacent layers of plastic sheathed core wound on a drum for relieving the sheathing from deforming strains and to permit a circulation therethrough of the heating medium used in vulcanizing the sheathing.

In order to attain these objects in accordance with one embodiment of the invention a layer of burlap or other suitable foraminous material is placed between the layers of portions of vulcanizable material arranged in spaced relation through which the heating medium may flow and thus uniformly heat all of the material during its vulcanization. In the case of a sheathed core wound on a foraminous drum in spaced helices, the burlap provides means for relieving strains imposed upon the sheathing by adjacent layers and provides practically unobstructed paths for the heating medium such as steam from the interior of the drum to the external layers of the material or vice versa.

It is believed that the invention will be clearly understood from the following description and accompanying drawings showing one embodiment of the apparatus and means by which the process may be practiced.

In the drawings,

Fig. 1 is a perspective view of a reel of vulcanizable material in strand form and the associated vulcanizing oven, a portion of the oven being broken away;

Fig. 2 is a sectional view part shown in elevation, of the vulcanizing oven with the reel containing the material in position ready for vulcanization, and Fig. 3 is an enlarged sectional fragmentary view of some of the sheathed cores on the reel, illustrating more clearly their spaced and separated formation.

A cylindrical oven 10 having one closed end is placed in a recessed portion of a floor and supported upon a base 11 therein. The other end of the oven is provided with a hinged door designated generally by the character 12. Attached to the inside of the lower portion of the oven and running lengthwise thereof are two suitable rails 13 which are supported by brackets 14. These rails are carried to the extreme left end of the oven and removable continuation portions 15 of such rails are provided for extending these rails to the surface of the floor 16 so as to provide a continuous track or way for the reel in inserting or withdrawing it from the oven. A carriage having a plurality of wheels 18 is adapted to be propelled along this track or way, and rollers 20 attached to end members 21 of the carriage provide means for supporting the heads 23 of the reel and whereby the reel may be revolved on the carriage.

Upon the exterior surface of and extending through the door 12 and supported by a suitable bearing and bushing member 25 is a shaft 26 upon the interior end of which is mounted a spider 27 having a plurality of projecting ends 28 for engagement with two of a plurality of openings 29 in the head 23 of the reel. Suitably supported by a bracket 30 mounted upon the exterior surface of the door is an arrangement for rotating the shaft 26. This arrangement may take any desired form such as shown, in which a motor operates through a gear reduction device to operate the gear wheel on the external end of the shaft 26. Suitable means (not shown) is provided for fastening the door when it is closed to make the joint between the end of the oven and the door sufficiently tight to prevent the escape of the heating medium from the oven during the vulcanizing process.

Near the closed end of the oven a conduit 35 is introduced into the oven and is connected with a horizontal conduit 36 adapted to extend into the interior of the reel. The conduit 35 may be connected through an ordinary hand operated valve with any suitable supply of heating medium, such as steam, and a plurality of perforations 38 in the conduit 36 permit the escape of the steam into the interior of the reel. A suitable cap 39 closes the left hand end of the conduit 36.

The reel consists of the pair of flanged heads 23 secured together by a plurality of tie rods 42. Supported by annular members 44 attached to the inside surfaces of the heads 23 is a drum 46 having a foraminous periphery, additional circular perforated plate supports 48 being provided intermediate the ends thereof. Extending around the exterior of the foraminous periphery of the drum is a foraminous member 50 provided with openings somewhat smaller than those in the periphery of the drum itself. Over the member 50 a layer, 51 preferably of burlap, or some similar porous material is provided, upon which the first layer of sheathed core 53 is wound in spaced relation as shown. Over each layer of sheathed core another layer of burlap or some similar material 54 is provided, and the helices of the adjacent layers are placed in staggered relation as regards the ones in the layer underneath.

In the carrying out of the process utilizing the apparatus shown on the drawings, the sheathed core 53 is wound upon the burlap covered foraminous member 50 extending around the periphery of the drum 46, and additional burlap layers are introduced as shown more clearly in Fig. 3. The winding of the core on the reel may be accomplished in any suitable manner such as by some take-up arrangement associated with the machine which extrudes the sheathing around the core. When the reel has received the desired amount of sheathed core it may be placed on the carriage with the circumferential portions of the heads 23 resting in the rollers 20. The carriage is then moved over the track or way, including the extensions 15 of the rails 13, within the oven. When the reel has been placed in the oven, the extension portions 15 of the rails are removed and the door 12 is closed. It will be noted that as the reel is introduced into the oven the conduit 36 extends through the central openings in one of the heads 23 and that the ends 28 on the spider 27 associated with the shaft 26 will engage a similar number of the openings 29 in the left hand head 23 of the reel. Before closing the door it is in some cases necessary either to rotate the reel slightly on the rollers 20 or to rotate the shaft 26 so that the ends 28 will easily register with the openings 29.

A valve (not shown) associated with the conduit 35 is then opened allowing steam to flow through such conduit and the motor device on the exterior of the door is operated to slowly revolve the reel upon the rollers 20 of the carriage by means of the shaft 26 and the spider 27. The rotation of the reel is continued throughout the entire vulcanization period. It will be noted that the steam, or other heating medium employed, in its escape through the perforations 38 of the conduit 36 may flow through the openings in the foraminous periphery of the drum 46 and the member 50, the burlap layer 51, between the helices of the first layer of the sheathed conductor 53, through the burlap layers 54, the spaces between the adjacent helices, and escape from the external layer. However, the steam or other medium may also flow through the openings in the supporting members 48, if required, and the openings 29 in the ends 23, and thus reach the external layer of the sheathed core. Such steam may also flow in a reversed direction between the adjacent helices and through the foraminous separation of layers and into the interior of the drum. In this manner all layers of the sheathed core are freely and quickly exposed to the heating medium and a uniform temperature may be maintained to insure uniform vulcanization throughout the length of the sheathing of the core.

It is evident that the period required for the proper vulcanization of the material and the temperatures employed may vary considerably, due to differences in the material to be vulcanized and in the degree of vulcanization desired.

What is claimed is:

1. The method of vulcanizing a plurality of portions of material, which consists in introducing flexible foraminous material between adjacent portions, and passing a heating medium through the foraminous material.

2. The method of vulcanizing a plurality of portions of material, which consists in arranging the portions in superposed layers, introducing flexible foraminous material between adjacent portions, and passing a heating medium through the foraminous material.

3. The method of vulcanizing a plurality of portions of material, which consists in arranging the portions in spaced relation in a plurality of superposed layers, separated by flexible foraminous material, and passing a heating medium through the foraminous material and the spaces between adjacent portions.

4. The method of vulcanizing a plurality of portions of material, which consists in arranging the portions in spaced relation in a plurality of superposed layers separated by flexible foraminous material, supplying heating medium to the outside layers, and passing such medium through the foraminous material and the spaces between the adjacent portions of vulcanizable material.

5. The method of vulcanizing a plurality of portions of material, which consists in arranging the portions in spaced relation in a plurality of superposed layers separated by flexible foraminous material upon a foraminous member, and passing a heating medium through the foraminous member, the foraminous material, and the spaces between the adjacent portions of vulcanizable material.

6. The method of vulcanizing a plurality of portions of material, which consists in arranging the portions in spaced relation in a plurality of superposed layers separated by resilient foraminous material for relieving strains imposed upon the portions in one layer by the portions in another layer, and passing a heating medium through the foraminous material and the spaces between the adjacent portions of vulcanizable material.

7. The method of vulcanizing a strand of vulcanizable material, which consists in forming a strand in separated convolutions of a helix arranged in a plurality of superposed layers separated by foraminous material, and passing a heating medium through the foraminous material and the spaces between adjacent convolutions.

8. The method of vulcanizing a strand of material, which consists in forming a strand in separated convolutions in a plurality of superposed layers separated by foraminous material upon a rotatable member, passing a heating medium through the foraminous material and the spaces between the adjacent helices, and continuously rotating the member.

9. The method of vulcanizing a strand of vulcanizable material, which consists in forming the strand in a plurality of separated convolutions in superposed layers separated by foraminous material, upon a foraminous drum, passing a heating medium through the foraminous drum, the foraminous material and the spaces between the convolutions, and simultaneously rotating the drum.

10. The method of vulcanizing a strand of vulcanizable material, which consists in forming the strand in separated convolutions in superposed layers separated by foraminous material upon a drum, supplying a heating medium to the inside of the drum and to the outside layer of strand, passing the heating medium through the spaces between adjacent convolutions and the foraminous material, and simultaneously rotating the drum.

11. The method of vulcanizing a sheathing for a core, which consists in forming a sheathed core in separated convolutions in superposed layers separated by foraminous material upon a drum, passing a heating medium through the spaces between adjacent convolutions and the foraminous material, and simultaneously rotating the drum to prevent deformation and decentralization of the sheathed core.

In witness whereof, I hereunto subscribe my name this 19th day of April A. D., 1923.

ARCHIE R. KEMP.